United States Patent [19]

Arnold

[11] Patent Number: 5,956,408
[45] Date of Patent: Sep. 21, 1999

[54] APPARATUS AND METHOD FOR SECURE DISTRIBUTION OF DATA

[75] Inventor: Todd Weston Arnold, Charlotte, N.C.

[73] Assignee: International Business Machines Corporation, Armonk, N.Y.

[21] Appl. No.: 09/022,650

[22] Filed: Feb. 12, 1998

Related U.S. Application Data

[63] Continuation of application No. 08/306,741, Sep. 15, 1994, abandoned.

[51] Int. Cl.[6] .............................. H04L 9/00; H04K 1/00
[52] U.S. Cl. ................................. 380/49; 380/4; 380/25; 380/50
[58] Field of Search .................................. 380/4, 49, 25, 380/50

[56] References Cited

U.S. PATENT DOCUMENTS

| 4,405,829 | 9/1983 | Rivest et al. | 380/30 |
| 5,003,591 | 3/1991 | Kauffman et al. | 380/10 |
| 5,027,397 | 6/1991 | Double et al. | 380/4 |
| 5,103,476 | 4/1992 | Waite et al. | 380/4 |
| 5,389,738 | 2/1995 | Piosenka et al. | 174/52.4 |
| 5,398,285 | 3/1995 | Borgelt et al. | 380/30 |
| 5,530,753 | 6/1996 | Easter et al. | 380/4 |

Primary Examiner—Gail O. Hayes
Assistant Examiner—Hrayr A. Sayadian
Attorney, Agent, or Firm—K. O. Hesse

[57] ABSTRACT

Data, including a program and software updates, is encrypted by a public key encryption system using the private key of the data sender. The data is also digitally signed by the sender. The receiver decrypts the encrypted data, using the public key of the sender, and verifies the digital signature on the transmitted data. The program interacts with basic information stored within the confines of the receiver. As result of the interaction, the software updates are installed within the confines of the user, and the basic information stored within the confines of the user are changed.

1 Claim, 6 Drawing Sheets

APPARATUS AND METHOD FOR SECURE DISTRIBUTION OF DATA

This is a continuation of application Ser. No. 08/306,741, filed Sep. 15, 1994, now abandoned.

BACKGROUND OF THE INVENTION

1. Field of the Invention

The present invention relates to an apparatus and method for secure distribution of data. More particularly, the present invention relates to an apparatus and method for secure distribution of software, software updates, and configuration data.

2. Description of Related Art

In today's business environment, data is one of the most valuable resources required for maintaining a competitive edge. As a result, businesses must often be able to maintain data confidentiality, readily determine the authenticity of data, and closely control access to data. As used herein, the term "data" means a representation of facts, concepts or instructions in a formalized manner suitable for communication, interpretation, or processing by human or automatic means, including, but not limited to, software, software updates, and configuration data.

Data systems commonly consist of many types and sizes of computer systems that are interconnected through many different electronic data networks. It is now common for an organization to interconnect its data systems with systems that belong to customers, vendors, and competitors. Larger organizations might include international operations, or they might provide continual services. For purposes herein, "computer" includes a device capable of performing the functions of a Turing Machine, including a microcomputer, minicomputer, or mainframe computer. A Turing Machine is a well-known computer science concept and is explained in Encyclopedia of Computer Science, Ed. Anthony Ralston, ISBN 0-88405-321-0, which is specifically incorporated herein by reference. "Memory" includes a device or devices for storing data for use by a computer, including electronic, magnetic, and electro-magnetic memory.

A combination of elements must work together to achieve a more secure environment. A security policy, based on an appraisal of the value of the data and potential threats to that data, provides the foundation for a secure environment.

Security functions can be categorized as follows:

Identification and authentication. Identifies users to the system and provides proof that they are who they claim to be.

Access control. Determines which users can access which resources.

Data confidentiality. Protects an organization's sensitive data from unauthorized disclosure.

Data integrity. Ensures that data is in its original forms and that it has not been altered.

Security management. Administers, controls, and reviews a business, security policy.

Nonrepudiation. Assures that the message was sent by the appropriate individual.

Cryptography includes a set of techniques for scrambling or disguising data so that it is available only to someone who can restore the data to its original form. In current computer systems, cryptography provides a strong, economical basis for keeping data confidential and for verifying data integrity. Cryptography: A Guide for the Design and Implementation of Secure Systems, by Carl H. Meyer and Stephen M. Matyas. ISBN 0-471-04892-5, John Wiley & Sons, Inc. (1982), is a classic text on the design and implementation of cryptographic systems, which is specifically incorporated herein by reference.

For commercial business applications, the cryptographic process known as the Data Encryption Algorithm (DEA) has been widely adopted. The Data Encryption Standard (DES), as well as other documents, defines how to use the DEA to encipher data. Federal Information Processing Standards Publication 46, which defines DES, is reprinted in the Meyer & Matyas text. Many other processes for concealing data, such as protection of passwords and personal identification numbers (PINs), are based on the DES process. The DES algorithm uses a key to vary the way that the algorithm processes the data. A DES key is a very small piece of data (56 bits) that is normally retained in 8 bytes. The same key is used to transform the original data (plaintext) to its disguised, enciphered form (ciphertext) and to return it to its plaintext form. Because the DES algorithm is common knowledge, one must keep the key secret to make the data confidential; otherwise, someone who has the key that one used to encipher the data would be able to decipher the data. Key management refers to the procedures that are used to keep keys secret.

To confirm the integrity of data, one can use the DES algorithm to compute a message authentication code (MAC). Used in this way the DES algorithm is a powerful tool; it is almost impossible to meaningfully modify the data and still have it produce the same MAC for a given key. The standardized approaches authenticate data such as financial transactions, passwords, and computer programs.

After the MAC has been computed, it is sent with data. To authenticate the data, the system uses the DES algorithm to recompute the MAC; the system then compares this result with the MAC that was sent with the data. Someone could, of course, change both the data and the MAC; therefore, the key that is used to compute the MAC must be kept secret between the MAC's originator and the MAC's authenticator.

An alternative approach to data integrity checking uses a standard key value and multiple iterations of the DES algorithm to generate a modification detection code (MDC). In this approach to data integrity checking, the MDC must be received from a trusted source. The person who wants to authenticate the data recomputes the MDC and compares the result with the MDC that was sent with the data.

Because the DES algorithm has been used for many years, its strength has been well demonstrated. Both software and specialized hardware can implement the DES algorithm. A hardware solution is often desirable for the following reasons:

the algorithm requires many computer instructions to be processed the keys must be protected so that they can remain secret performance can be improved If a data security threat comes from an external source, a software implementation of the cryptographic algorithm might be sufficient; unfortunately, however, much fraud originates with individuals within an organization (insiders). As a result, specialized cryptographic hardware can be required to protect against both insider and outsider data security threats. Well-designed hardware can do the following:

ensure the security of cryptographic keys ensure the integrity of the cryptographic processes limit the key-management activities to a well-defined and carefully controllable set of services The DES algorithm, which has been proven to be efficient and strong, is widely known; however the keys must normally remain secret. Because the same key is used both to encipher the data and to decipher the data, the process is said to be symmetric; it uses a symmetric key.

In another type of cryptographic process, an asymmetric process, one key is used to encipher the data, while a different but corresponding key is used to decipher the data to its original form. A system that uses this type of process is known as a public-key system. The key that is used to encipher the data is widely known, but the corresponding key for deciphering the data is secret. For example, many people who know a person's public key can send enciphered data to that person confidentially, knowing that only that person should possess the secret key for deciphering the data. Public-key cryptographic algorithms have been incorporated into processes for simplifying the distribution of secret keys and for assuring data integrity, including providing nonrepudiation by using digital signatures. Public-key and digital signature techniques are discussed in more detail the Meyer & Matyas text.

Public-key algorithms (e.g., RSA algorithm, by R. Rivest, A. Shamir, and L. Adleman) use a relatively large key and use even more computer time than the DES algorithm. The use of a public-key system is, therefore, often restricted to situations in which the characteristics of the public-key algorithms have special value.

In both the DES and RSA algorithms, no practical means exists to identically cipher data without knowing the cryptographic key; therefore, keeping a key secret at a cryptographic node is essential. In real systems, however, this often does not provide sufficient protection. If adversaries have access to the cryptographic process and to certain protected keys, they could possibly misuse the keys and eventually compromise the system. A carefully devised set of processes must be in place to protect and distribute cryptographic keys in a secure manner.

Access control protects data by allowing only persons or programs with a legitimate need to access system resources, such as a file, selected records or fields in a file, a hardware device, or the computing capability of the system. Access control uses the following services:

Identification and verification. Identification is the ability to use a unique name, label, or other reference to identify each user or program to the system. Verification is the ability to provide proof that users and programs are who and what they claim to be. (Verification is also known as "authentication".)

Authorization. Authorization is the process whereby users or programs are restricted to specific resources, such as data sets, programs, or transactions. (Authorization is also known as "access control".)

Enforcement. Enforcement is a subsystem process of verifying the requester's authorization.

In systems that consist of multiple computers, it is increasingly necessary for persons or programs at one system to be able to convince persons or programs at another system that they are entitled to receive service. Common solutions to this problem involve the following:

using local access controls using cryptographic processing to ensure the authenticity of a process ensuring that the authorization information is confidential Many computer products and peripherals now have their own intelligence, separate from the computer itself, in the form of integrated microprocessors. These microprocessors use stored programs to provide some part of the device's function. For example, the IBM 4755 Cryptographic Adapter is a device which includes a microprocessor, memory, and programming logic mounted on a printed circuit board. Functions are housed within a tamper-resistant module, or secured area, for protection, such as that discussed more fully in U.S. Pat. No. 5,027,397, which is specifically incorporated herein by reference. The IBM 4755 is a component of the IBM Transaction Security System, discussed in the IBM publication entitled "Transaction Security System: General Information Manual and Planning Guide" (GA34-2137-0), U.S. Pat. No. 5,048,085, and U.S. Pat. No. 5,148,481, which are specifically incorporated herein by reference.

Typically, two kinds of memory are associated with these microprocessors: permanent (unalterable or nonvolatile) memory for the program; and volatile memory for data used by the program. Permanent memory is typically Read Only Memory (ROM), Programmable Read Only Memory (PROM), or Erasable Programmable Read Only Memory (EPROM). Volatile memory is typically a static or dynamic Random Access Memory (RAM), which loses all stored data when power is removed.

Newer technologies allow the designer to use memory which is nonvolatile, but reprogrammable. That is, memory in which the data can be changed, but the contents are retained when the power is off. Several technologies can be used to obtain these characteristics. Flash EPROM (FEPROM) permits areas of memory to be erased electronically and then reprogrammed. Electrically Erasable PROM (EEPROM) permits individual bytes or bits to be rewritten much like RAM memory. Complementary Metal-Oxide Semiconductor (CMOS) RAM with battery back-up uses little power and retains RAM contents when system power is off.

These newer kinds of memory can be used in two ways to improve the value of the product.

First, if some or all of the microprocessor program is stored in nonvolatile, reprogrammable memory, the program can be changed after the product is manufactured. Thus, new features can be added and errors can be corrected. This prevents product obsolescence and protects the manufacturer from high warranty costs when errors occur.

Second, data stored in the memory can control the configuration of the product. One such use it; to selectively enable or disable product features. In this way, the manufacturer can produce a standard product, and sell it for a variety of applications which need different features. Users can be charged for an upgrade to enable new features, which will be highly profitable to the manufacturer since no new hardware has to be shipped or installed.

There are many circumstances which would make it advantageous to be able to target such upgrades to a specific subset of the total population of devices. The reason may be to prevent applying an upgrade that is incompatible with the underlying hardware or software, or it may be to restrict the upgrade to a specific set of users or devices. For example, the manufacturer may want to apply the upgrade only to devices which have:

a particular model number a manufacture date within a particular range of dates a particular version of software installed a certain ranges of serial numbers a specific combinations of features It is easy to see why this kind of flexibility is highly desirable, for both the manufacturer and the user. There is a significant impediment to its use, however; security.

Both the manufacturer and user want to be sure they have control over programs that are loaded into the memory. The manufacturer may want to make sure only its programs are used, to ensure the programs meet quality and performance standards. The manufacturer may also want to prevent anyone from learning how the software works, or what the data is that is being sent to the user. The user, on the other hand, wants to make sure the programs in the devices are valid, and prevent any that might malfunction, or which might pose a security threat. An example of a security threat would be a "Trojan horse" program which would normally operate correctly, but which had "secret" features to circumvent the user's security practices, or to divulge the user's secret information.

Typically, there will be one source for all field upgrades to code or configuration data, although other scenarios are possible. For the purposes of discussion, assume that the device manufacturer is the only valid source of code or data updates; and the device is a security adapter card, with a secured area or module where data is protected from disclosure. The problem can then be described with two fundamental requirements:

First, data sent to the user must be kept secret. It must be impossible for anyone to discover or modify the contents of the data.

Second, the user must be able to verify that: the data came from the valid source (e.g., the manufacturer). This is a form of non-repudiation.

SUMMARY OF THE INVENTION

The present invention overcomes the disadvantages and limitations of the related art by providing an apparatus and method for secure distribution of software, software updates, and configuration data. Cryptography is used to protect software or data updates sent to computer products or peripherals using non-secure distribution channels. In the preferred embodiment, the contents of the data cannot be read by anyone who obtains the data, and the data will not be accepted unless it is unmodified and originated with the valid source for such data.

An advantage of the invention is to provide an apparatus and method for secure distribution of software, software updates, and configuration data.

Another advantage of the invention is to provide an apparatus and method wherein data stored in memory controls the configuration of a product so as to selectively enable or disable product features.

Yet another advantage of the invention is to provide an apparatus and method wherein data stored in memory controls the acceptance or rejection of proposed data for a product.

The foregoing and other advantages of the present invention will be apparent to those skilled in the art of information handling technology in view of the accompanying drawings, description of the invention, and appended claims.

DESCRIPTION OF THE PREFERRED EMBODIMENT

Figure 1:
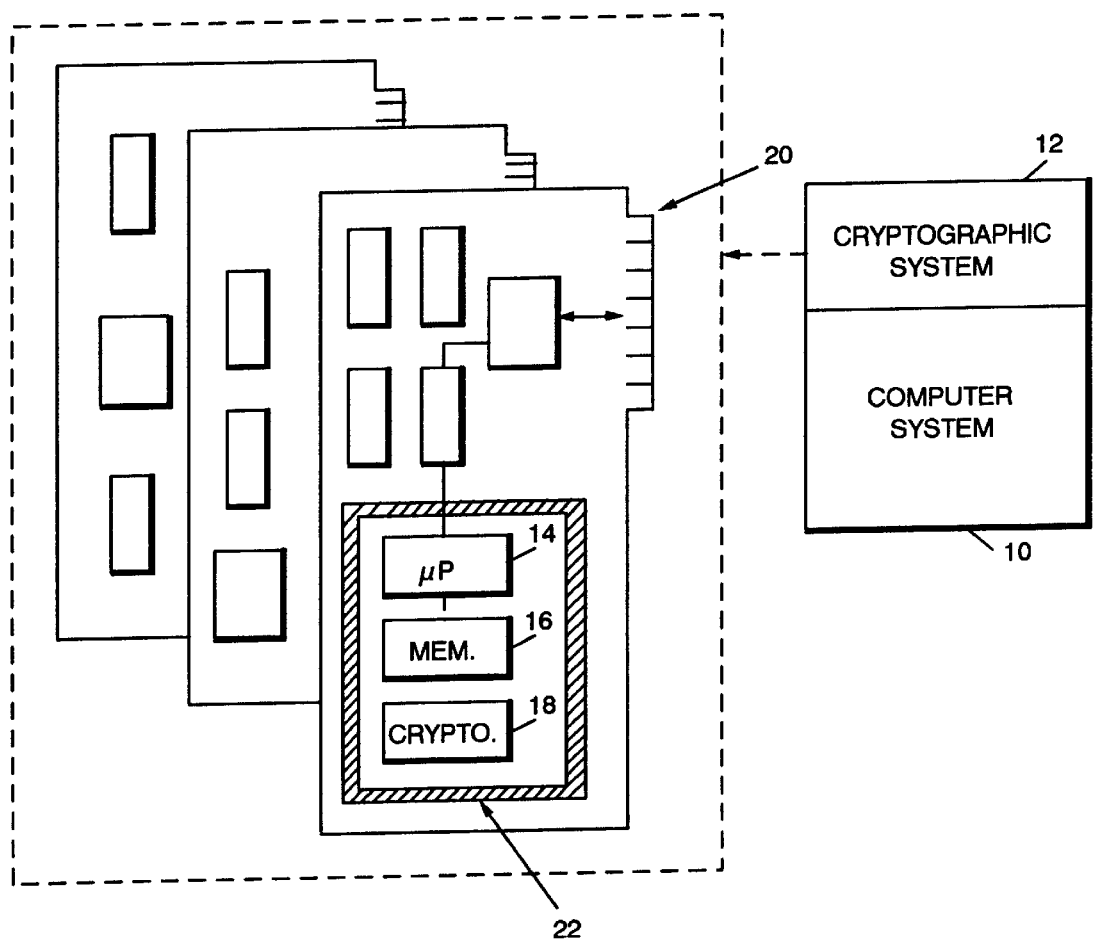
FIG. 1 is a block diagram depicting a computer system and associated cryptographic system, wherein an enlargement of an embodiment of the cryptographic system is broken out.

Referring now to FIG. 1, a computer or computer system 10 is shown which includes a cryptographic system 12 comprising a microprocessor 14, memory 16, and cryptographic functions 18 mounted upon a device or adapter card 20. The microprocessor, memory, and cryptographic functions are housed within a secured area or module 22.

Figure 2:
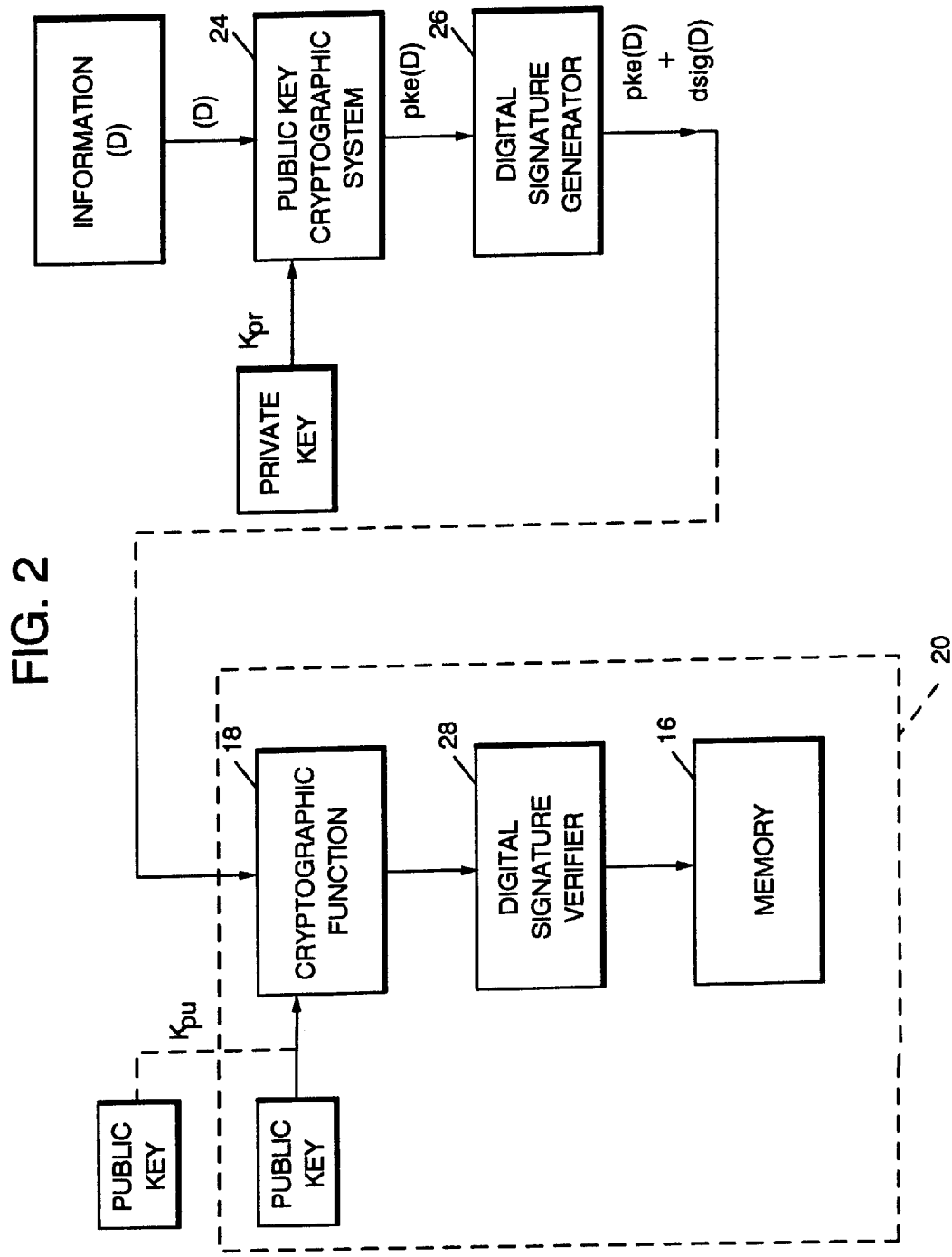
FIG. 2 is a block diagram of an embodiment of the invented apparatus for secure distribution of software, software updates, and configuration data employing public key cryptography.
Figure 4:
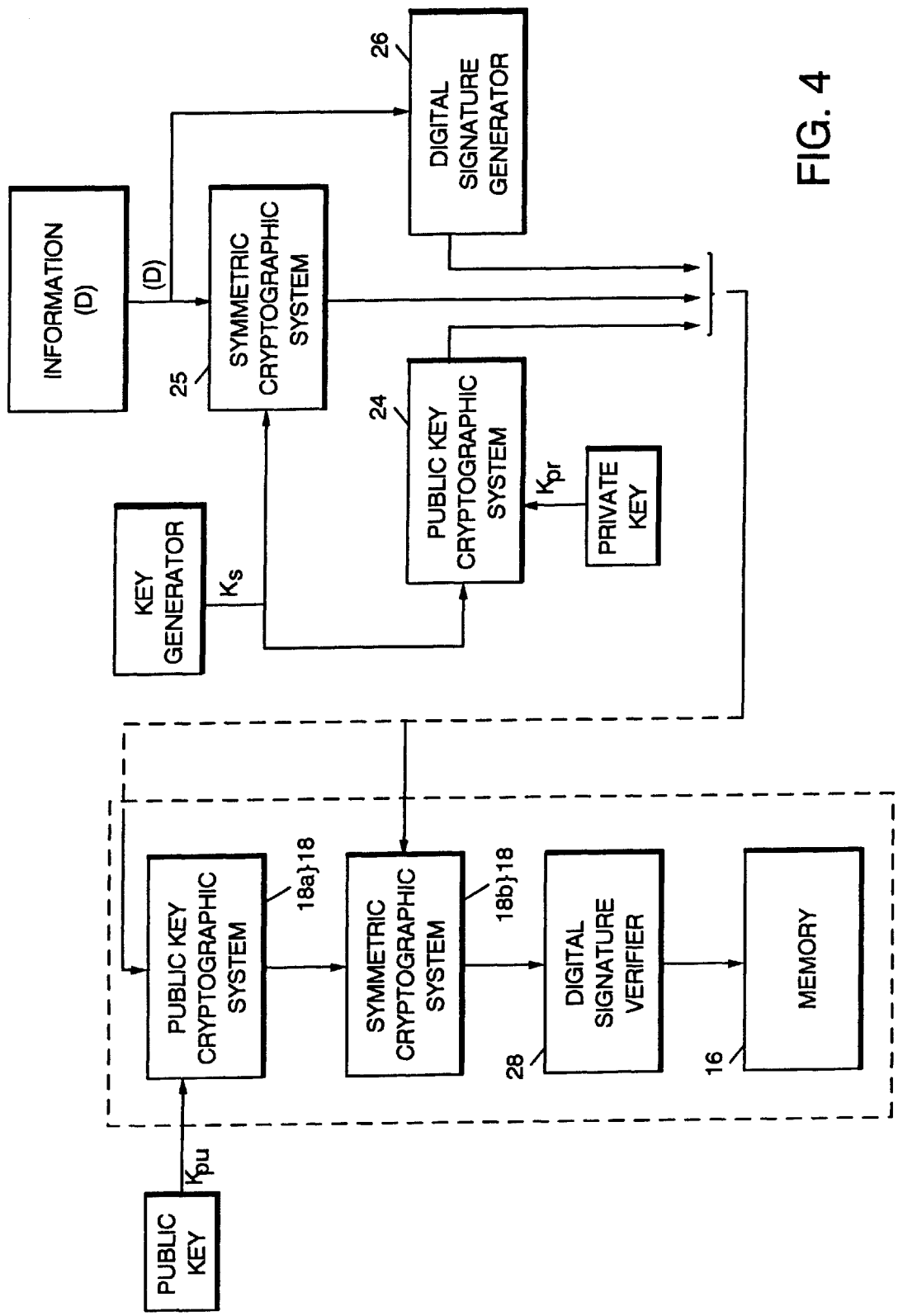
FIG. 4 is a block diagram of an embodiment of the invented apparatus for secure distribution of software, software updates, and configuration data employing public key cryptography and symmetric key cryptography.

As shown in FIG. 2, a public key $K_{PU}$ is installed in the adapter card 20. Cryptographic system 12 includes the public key algorithm (e.g., RSA). The corresponding private key $K_{PR}$ would be held by, for example, the adapter card manufacturer, in a secure, secret manner so it would never be disclosed outside the manufacturer's organization. Preferably, the data is protected twofold:

First, as shown in FIG. 2, data, D, is encrypted by a public key cryptographic system 24 using the private key, $K_{PR}$, or as shown in FIG. 4, data is encrypted by a symmetric key cryptographic system 25 using the symmetric key, $K_S$. This provides the necessary secrecy; the data content cannot be determined by anyone intercepting the data, and any modification to the encrypted data will render it invalid.

Second, in FIGS. 2 and 4, a digital signature on the data is computed and sent to the adapter card users using a digital signature generator 26. This signature is verified before the data is accepted by digital signature verifier 28, which can be a component of cryptographic function 18 or a separate function as shown. Preferably, cryptographic function 18 include both a public key cryptographic system 18a and a symmetric cryptographic system 18b. A verified digital signature proves that the data has not been altered since its creation, and proves that the originator was, in this example, the manufacturer.

Two embodiments of the invention are described below.

Using Only Public Key Cryptography

Figure 3:
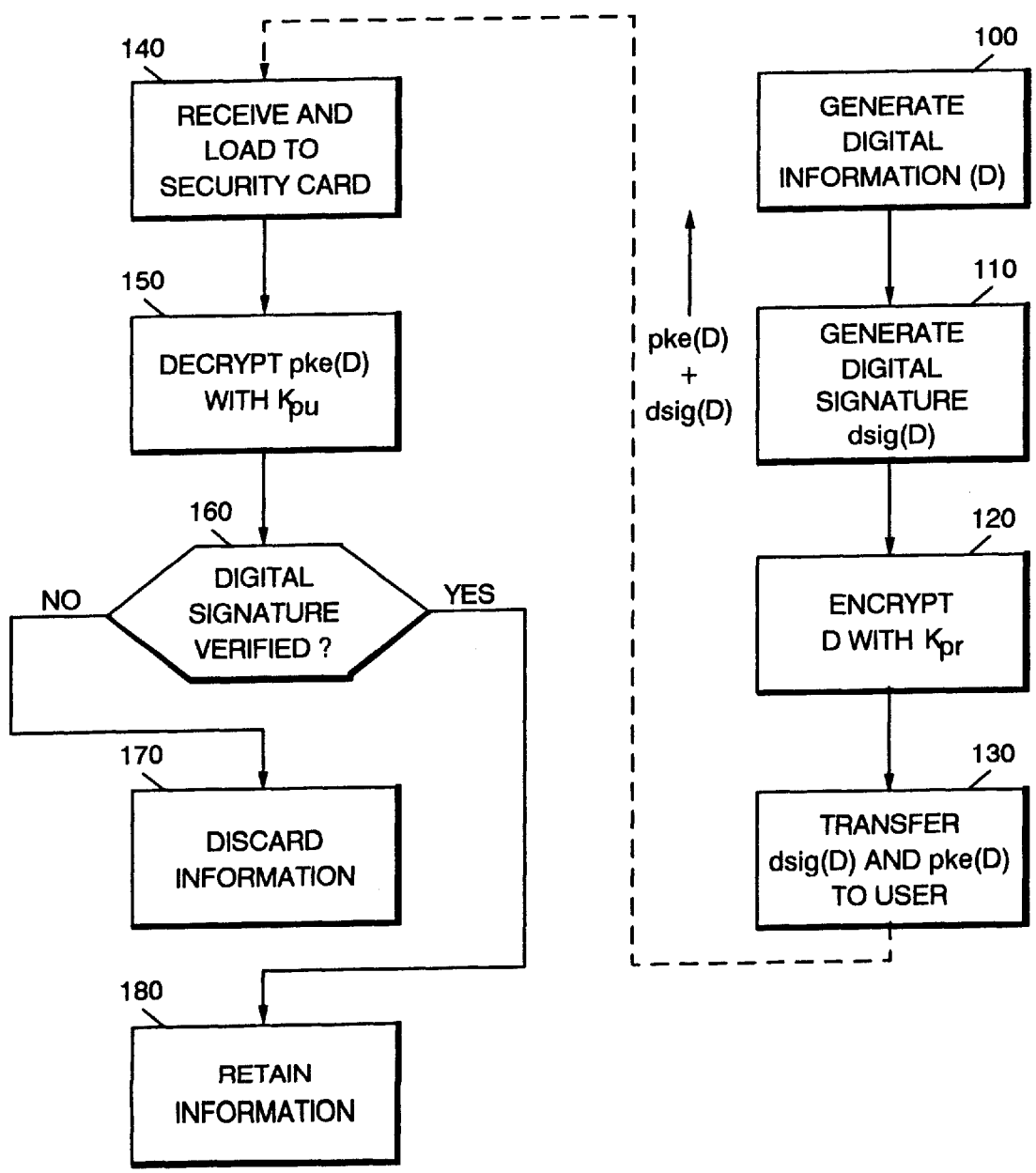
FIG. 3 is a flowchart of an embodiment of the invented method for secure distribution of software, software updates, and configuration data employing public key cryptography.

The first four steps in FIG. 3. are performed by the manufacturer, who sends the resulting data to the users. The remaining steps are performed by the user to load the data into the adapter card.

The manufacturer first generates the data to be loaded into the adapter cards in step 100. This data is designated D. The manufacturer already possesses private key $K_{PR}$, and the corresponding public key $K_{PU}$ is with every adapter card manufactured. The key $K_{PU}$ may be embedded in the adapter card, or may be supplied externally on a diskette or other medium if it is protected against substitution (e.g., by a certification process). It does not need to be kept secret in order to maintain integrity of the loaded data.

In step 110, the manufacturer computes a digital signature on the data D using the private key $K_{PR}$. The use of the digital signature is optional. Its use enhances the ability to prove the source of the data, but the data can be distributed successfully without a signature. The digital signature function is represented as dsig( ). The signature will be verified before the data is accepted by the adapter card, assuring it came from the manufacturer in this example.

In step 120, the data D is encrypted using the public key algorithm with key $K_{PR}$. This protects the data from disclosure or modification prior to its installation in the adapter card. The function pke( ) represents a public key encryption algorithm, such as the RSA algorithm.

The manufacturer, in step 130, sends the encrypted data pke(D) and the digital signature dsig(D) to the card users through any convenient channel; diskettes, electronic mail, or any other medium is sufficient. The user receives this information, and loads the data and signature into the secured area of the adapter card in step 140.

In step 150, the adapter decrypts the data using the public key $K_{PU}$, recovering the clear data D. Following this, in step 160, the digital signature is verified using the same key. If the signature verifies, the data is genuine and it can only have been created by the manufacturer, who holds the private key $K_{PR}$. Once the data has been decrypted and its validity has been determined, the data is applied to the nonvolatile memory in the adapter card, step 180; otherwise, the information is discarded, step 170.

Only the private key $K_{PR}$ needs to be kept secret. The public key $K_{PU}$ is present in every copy of the device, and there is no security exposure if its value is divulged. The nature of the public key algorithms guarantees that the private key cannot be determined from the public key, and that valid data cannot be generated with knowledge of the public key alone.

Using Public Key and Symmetric Key Cryptography

Alternatively, the data can be encrypted using a symmetric key cryptographic algorithm (e.g., DES) instead of the public key algorithm used above. With current technology, symmetric key algorithms are generally faster to compute than public key algorithms, so this method is presently preferable. A randomly selected symmetric algorithm key is used each time new data is produced.

Figure 5:
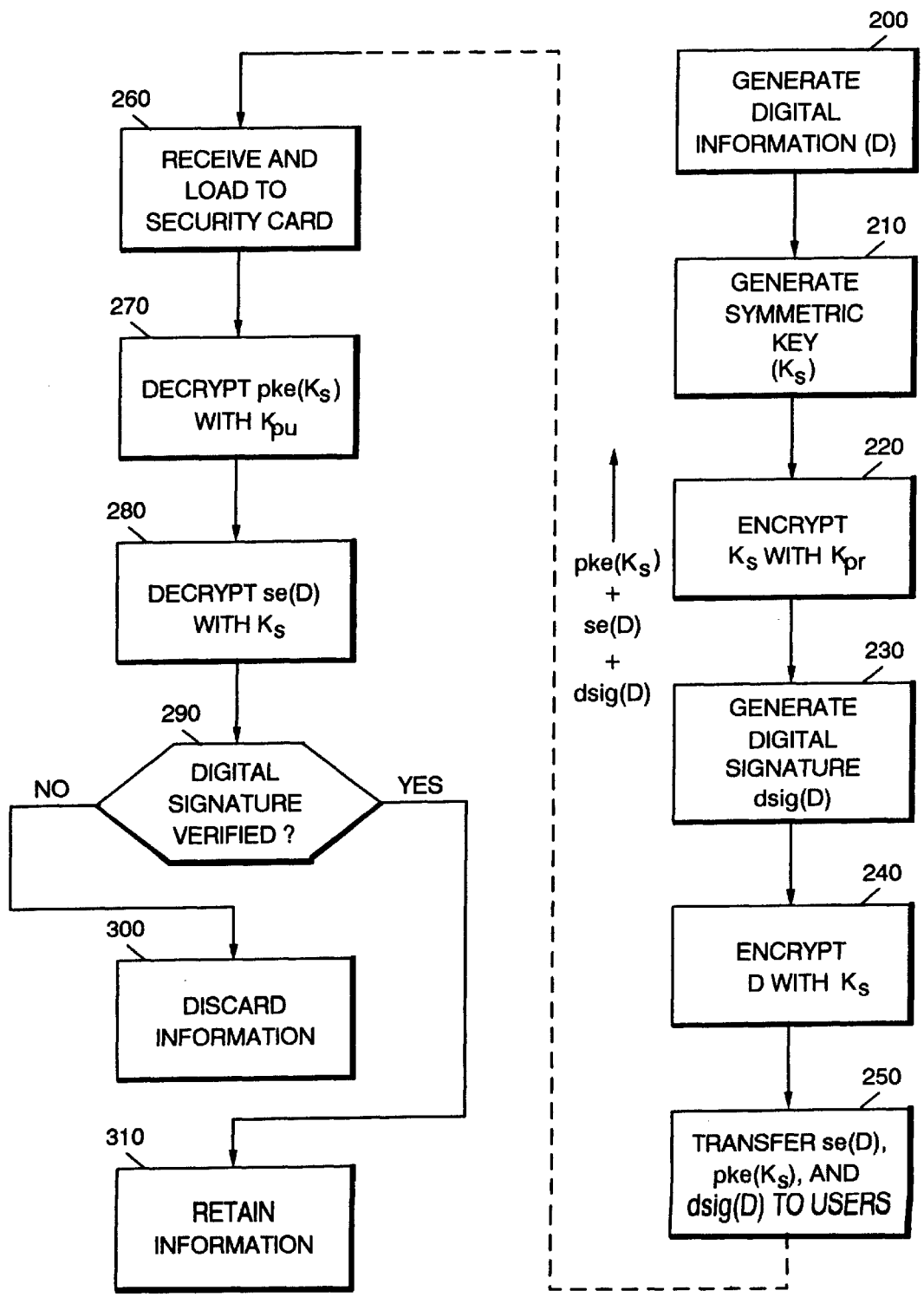
FIG. 5 is a flowchart of an embodiment of the invented method for secure distribution of software, software updates, and configuration data employing public key cryptography and symmetric key cryptography.

As shown in step 200 of FIG. 5, the manufacturer generates the data D to be sent to the installed cards in the field. In the step 210, a random symmetric algorithm key designated $K_S$ is generated. The users do not have key $K_S$, so the manufacturer must sent it to them in a secure manner. In step 220, $K_S$ is encrypted with a public key algorithm using the private key $K_{PR}$.

In step 230, the manufacturer computes a digital signature over the data D, and in step 240 the data is encrypted using the symmetric key algorithm with key $K_S$. The encrypted $K_S$, the encrypted data pke(D) and the digital signature dsig(D) are all sent to the user in step 250.

In step 260, the data is received at the user site where adapter cards are installed. The data is loaded into the secured area of the card, which contains the public key $K_{PU}$. In step 270, $K_{PU}$ is used to decrypt the symmetric key $K_S$ using the public key algorithm. In step 280, the recovered $K_S$ is used to decrypt the data using the symmetric key algorithm.

In step 290, the digital signature is verified using $K_{PU}$, in order to verify the origin of the data. If the signature verifies, it means that both the data D and the key $K_S$ were valid; in this case, the data is loaded into the nonvolatile memory on the adapter card and enabled for use, step 310. Otherwise, the data is discarded or otherwise rejected. All cryptographic calculations are preferably performed inside the secured area, so there is no threat of data manipulation while the data is recovered and verified.

With either method described above, other checking codes could be used as an alternative to the digital signature. An MDC, cyclic redundancy check (CRC), or any other valid checking code could be calculated over the data and appended to the data before it is encrypted. Once the data has been decrypted in the adapter card's secure environment, this value could be verified against the recovered data. If it verifies, the data is correct and originated with the holder of the private key $K_{PR}$.

Use of Information in the Data as Decision Criteria

Once the data has been loaded into the adapter card, the decision of whether to permit the data to be employed can be made a function of information and/or instructions contained within the data itself.

Figure 6:
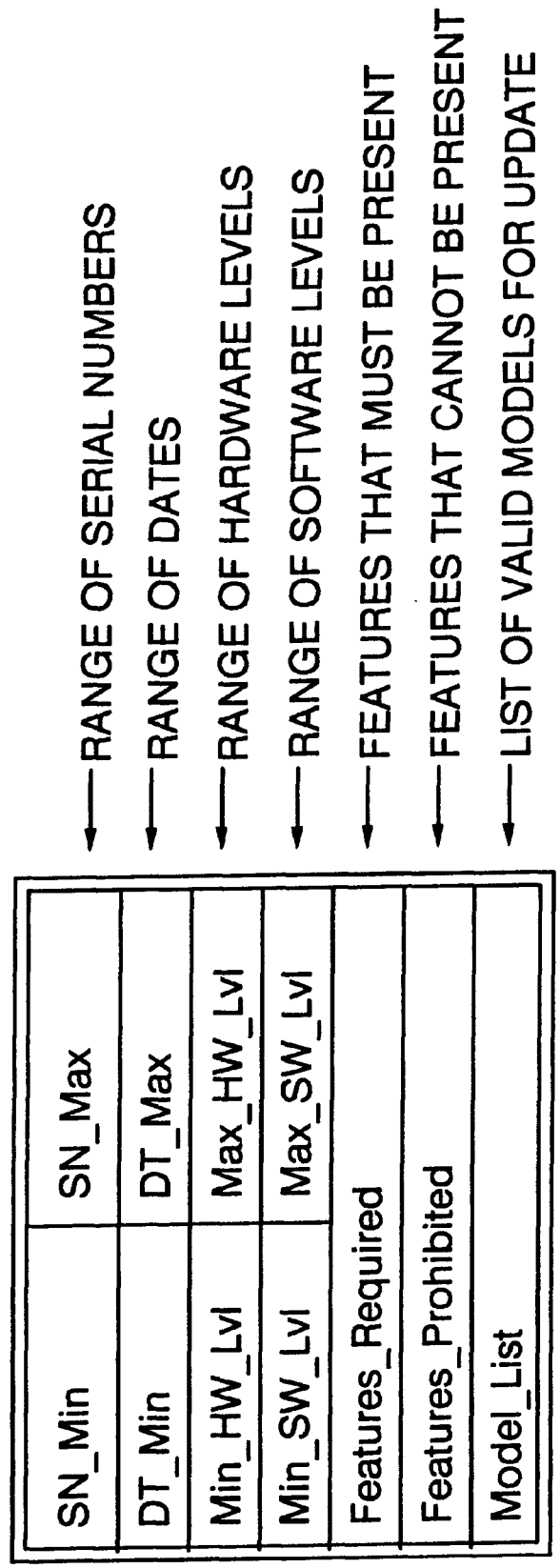
FIG. 6 is a depiction of criteria information in tabular form.

In one embodiment, software contained in the device is used to compare "criteria information" in the data with "basic information" already contained in the device. Examples of such basic information include:

serial number model codes date of manufacture version of software currently installed codes describing installed or available features The basic information in the device is stored in memory (including hardware registers, permanent software, or resident loadable software). The criteria information is preferably included in the data in tabular form, for example, as shown in FIG. 6. The data, and therefore the criteria information, is securely distributed in the manner described in the previous sections herein. Control software within the device examines this table and compares it to the appropriate basic information in order to decide whether to apply the data.

The pseudocode in Table 1 is an example of how the criteria information from the table would be processed. Each item in the table would be compared with the appropriate basic information contained within the device itself. The results of the comparisons would be used to determine whether the data should be applied to the particular device.

TABLE 1

```
Load_Permitted = FALSE;
If SN_Min <= SN <= SN_Max then Do;
    If DT_Min <= DT <= DT_Max then Do;
        If Min_HW_Lvl <= HW_Lvl <= Max_HW_Lvl then Do;
            If Min_SW_Lvl <= SW_Lvl <= Max_SW_Lvl then Do;
                Get Feature_Vector;
                If all Features_Required features are present then Do;
                    If no Features_Prohibited features are present then Do;
                        If Model_List is empty then Load_Permitted = TRUE;
                        Else do While Model_List not empty;
                            Get Test_Model from head of Model_List;
                            If Test_Model = model of this device
                            then Load_Permitted = TRUE;
If Load_Permitted = TRUE then load data to memory;
Else Abort loading process
```

SN_Min and SN_Max are the lowest and highest serial numbers the device can have for the data to be valid. In the pseudocode in Table 1, the serial number for a specific device is designated SN.

DT_Min and DT_Max are the earliest and latest dates the device can have for the data to be valid, e.g., the manufacturing date, the microcode creation date, or some other date code. Several different dates could be compared if desired. In the pseudocode in Table 1, the date code for a specific device is designated DT.

Min_HW_Level and Max_HW_Level are the lowest and highest hardware levels the device can have for the data to be valid. This represents the version of hardware in the device. HW_Level is used in the pseudocode to represent a particular device's hardware level.

Min_SW_Level and Max_SW_Level are the lowest and highest software levels the device can have for the data to be valid. This represents the version of software in the device prior to application of the data. SW_Level is used in the pseudocode to represent the particular device's software level.

Features_Required and Features_Prohibited are vectors of boolean values. They represent the features the device must have for the data to be valid, and the features the device must not have for the data to be valid. In the pseudocode, Feature_Vector represents a vector of boolean values representing the features present in a specific device.

Model_List is a list of product models which are valid targets for the data. An empty list can be used to indicate that the data is valid for all models. Otherwise, the device looks for its own model code in the list; if it is not present, the data will not be applied.

In an alternative embodiment, one implementation of which is illustratively shown in pseudocode in Table 2, the data itself contains special software ("checking software") to determine if the data should be applied to the device. The data, and therefore the checking software, is securely distributed in the manner described in the previous sections herein. This checking software is not a part of the operational software used in the everyday application of the device. The additional checking software may be optional; if present, it is called by the control software which resides in the device, and it determines whether the data should be applied. The same checking software can also contain special initialization instructions to prepare the device for the new software or data contained in the data.

TABLE 2

```
If checking software present in the data then Do;
    Load checking software;
    Verify checking software is valid;
    Abort if invalid;
    Execute checking software;
    If result = "ok to load data" then Do;
        Get data;
        If data is valid
        Then load data to memory;
    Else abort
```

This embodiment is more flexible than the first embodiment since its functions are not limited to a set conceived by the initial device designers. Functions can be added with any data update, simply by changing the checking program.

In operation, this embodiment can be combined with the first embodiment. A fixed set of checking functions can be permanently stored in the device, with additional functions contained in the checking software portion of the data.

The function performed by the checking software is completely up to the designer of that software. Its functions would typically be similar to those described for the first embodiment, but could include any checking or initialization deemed necessary by the designer.

A similar approach can be used to provide optional software that would be executed immediately after the data is loaded. This could perform initialization necessary to prepare the updated device for use.

Of course, many modifications and adaptations to the present invention could be made to advantage without departing from the spirit of this invention. Further some features of the present invention could be used without corresponding use of other features. Accordingly, this description should be considered as merely illustrative of the principles of the present invention and not in limitation thereof.

I claim:

1. A method for securely controlling the configuration of a computer system so that features of the system may be enabled or disabled, said method including the steps of:

providing memory which is located within a secured area, said memory being protected from physical and direct electrical access said memory storing basic information;

encrypting data, said data including a program and software updates as specific features at another computer system under the private key of a public key encryption system; and digitally signing said data;

decrypting the data and verifying the digital signature of said data within the secured area with a public key of the public key encryption system, wherein said public key is stored within said secured area;

executing said program within said secured area, said program interacting with the basic information stored in said memory and installing in said memory in the secured area, as result of said interaction, said specific features which are the software updates; and changing said basic information stored in the memory of the secured area, which change results as part of the interaction of said program with the basic information existing before said interaction.

* * * * *